(12) United States Patent
Miyagawa (10) Patent No.: US 11,945,148 B2
(45) Date of Patent: Apr. 2, 2024

(54) INJECTION MOLDING MACHINE

(71) Applicant: FANUC CORPORATION, Minamitsuru-gun (JP)

(72) Inventor: Isao Miyagawa, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 17/918,370

(22) PCT Filed: Apr. 12, 2021

(86) PCT No.: PCT/JP2021/015112
§ 371 (c)(1),
(2) Date: Oct. 12, 2022

(87) PCT Pub. No.: WO2021/210520
PCT Pub. Date: Oct. 21, 2021

(65) Prior Publication Data
US 2023/0145021 A1 May 11, 2023

(30) Foreign Application Priority Data

Apr. 16, 2020 (JP) ................................ 2020-073282

(51) Int. Cl.
*B29C 45/00* (2006.01)
*B29C 45/66* (2006.01)
*B29C 45/76* (2006.01)

(52) U.S. Cl.
CPC ........ *B29C 45/7653* (2013.01); *B29C 45/661* (2013.01); *B29C 2945/76013* (2013.01);
(Continued)

(58) Field of Classification Search
None
See application file for complete search history.

(56) References Cited

FOREIGN PATENT DOCUMENTS

| CN | 101111359 A | * | 1/2008 | ............. B29C 45/66 |
| JP | S 62-021517 A | | 1/1987 | |

(Continued)

OTHER PUBLICATIONS

Akihisa CN101111359 A English Translation 2008 (Year: 2008).*
International Search Report (ISR) (PCT Form PCT/ISA/210), in PCT/JP2021/015112, dated May 25, 2021.

*Primary Examiner* — Jacob T Minskey
*Assistant Examiner* — Adrien J Bernard
(74) *Attorney, Agent, or Firm* — MCGINN I.P. LAW GROUP, PLLC.

(57) ABSTRACT

An injection molding includes: a clamping mechanism (conversion mechanism and toggle mechanism) for moving a fixed platen that retains a fixed die toward a fixed platen that retains a fixed die to bring the fixed die and the movable die into contract, and generating a clamping force therebetween; a drive source (mold opening/closing motor) for driving the clamping mechanism; a clamping force detection unit for detecting the clamping force; an elongation value detection unit for detecting an elongation value indicating the amount of elongation of a tie bar that extends as the clamping force is generated; and an abnormality determination unit for determining an abnormality in the injection molding machine on the basis of the ratio of the elongation value and the clamping force.

20 Claims, 4 Drawing Sheets

(52) U.S. Cl.
CPC .......... *B29C 2945/761* (2013.01); *B29C 2945/76163* (2013.01); *B29C 2945/7623* (2013.01); *B29C 2945/76234* (2013.01); *B29C 2945/76391* (2013.01); *B29C 2945/76505* (2013.01); *B29C 2945/76709* (2013.01); *B29C 2945/76869* (2013.01)

(56) References Cited

FOREIGN PATENT DOCUMENTS

| | | |
|---|---|---|
| JP | H 09-057804 A | 3/1997 |
| JP | 2004-122579 A | 4/2004 |
| JP | 2005-313460 A | 11/2005 |
| JP | 2008-119834 A | 5/2008 |
| JP | 2010-099847 A | 5/2010 |
| JP | 2010-137542 A | 6/2010 |
| WO | WO 2006/098321 A1 | 9/2006 |

* cited by examiner

INJECTION MOLDING MACHINE

TECHNICAL FIELD

The present invention relates to an injection molding machine.

BACKGROUND ART

Various methods have been proposed for detecting an abnormality in a mechanical unit of an injection molding machine. In these methods, generally, such an abnormality of the mechanical unit is detected using various sensors and jigs (for example, JP 2010-137542 A). However, installation and setting of the sensors and the jigs are complicated, and it is difficult to detect an abnormality if the sensor or the jig gets out of order.

SUMMARY OF THE INVENTION

An object of the present invention is to provide an injection molding machine capable of relatively easily detecting abnormalities of a mechanical unit.

According to an aspect of the present invention, there is provided an injection molding machine including: a stationary platen configured to hold a fixed mold; a rear platen; a tie bar configured to connect the stationary platen and the rear platen to each other; a movable platen that is disposed between the stationary platen and the rear platen and is configured to hold a movable mold in a manner that the movable mold faces the fixed mold and further configured to be movable along the tie bar; a mold clamping mechanism configured to generate a mold clamping force between the fixed mold and the movable mold by moving the movable platen toward the stationary platen and bringing the fixed mold and the movable mold into contact with each other; a drive source configured to drive the mold clamping mechanism; a mold clamping force detection unit configured to detect the mold clamping force; an elongation value detection unit configured to detect an elongation value indicating an elongation amount of the tie bar that is elongated as a result of generation of the mold clamping force; and an abnormality determination unit configured to determine whether there is an abnormality in the injection molding machine, based on a ratio between the mold clamping force and the elongation value.

According to the present invention, it is possible to provide an injection molding machine capable of relatively easily detecting an abnormality of a mechanical unit.

DESCRIPTION OF THE INVENTION

Hereinafter, an injection molding machine according to an embodiment will be described in detail.

Figure 1:
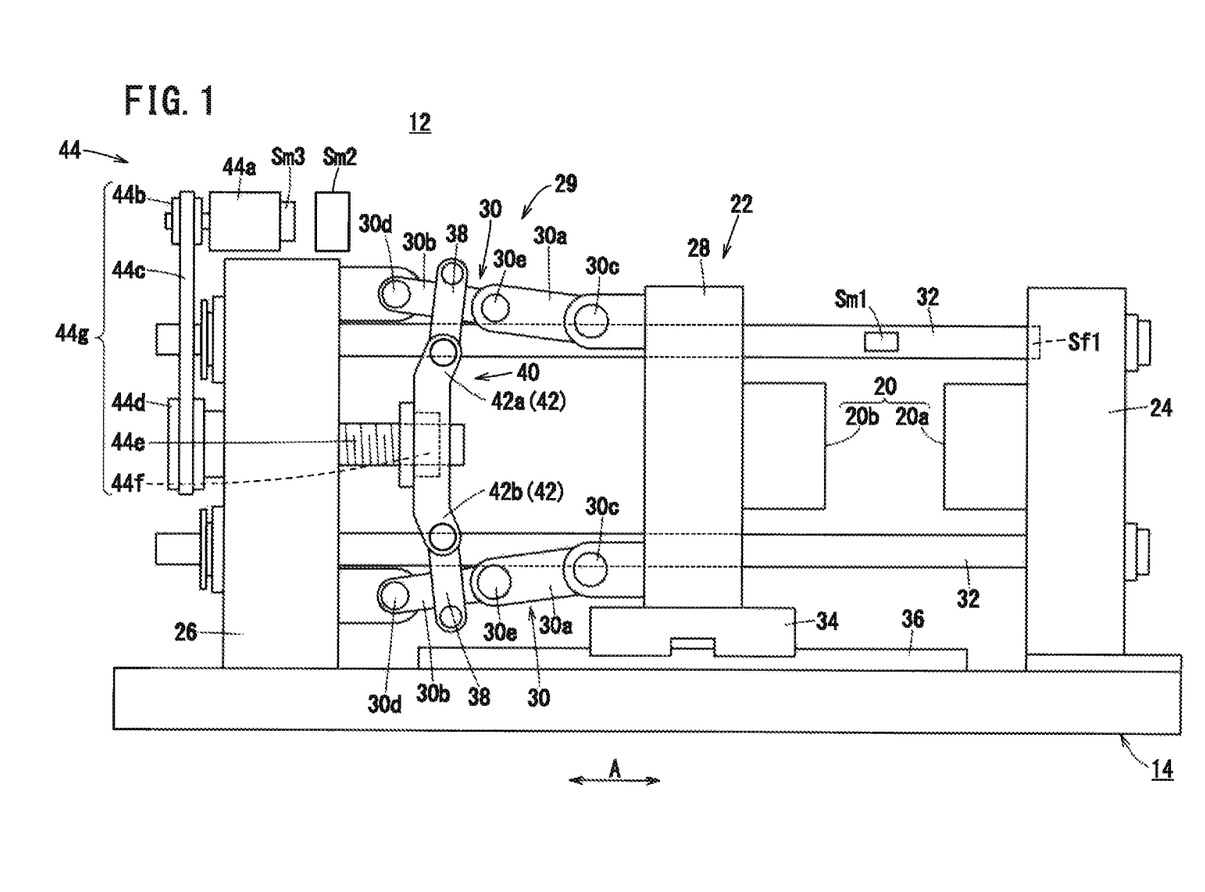
FIG. 1 is a view showing an injection molding machine main body according to an embodiment.

FIG. 1 is a view showing an injection molding machine main body 12 according to the embodiment. The injection molding machine main body 12 includes a base 14, a mold clamping device 22 that opens and closes a mold 20, and an injection device (not shown) that injects a molten resin into the mold 20.

The base 14 is a pedestal for installing the mold clamping device 22 and the injection device. The mold clamping device 22 includes a stationary platen 24, a rear platen 26, a movable platen 28, a toggle mechanism 29, and a toggle drive mechanism 44.

The stationary platen 24 and the rear platen 26 are disposed on the base 14, and are connected to each other by four tie bars 32 parallel to each other, the tie bars extending in a direction A so as to penetrate through the movable platen 28. The movable platen 28 is disposed between the stationary platen 24 and the rear platen 26 on the base 14 via a sliding portion 34. The sliding portion 34 can move along a guide rail 36 disposed along the direction A on the base 14. Thus, the movable platen 28 can move toward and away from the stationary platen 24 in the direction A.

The mold 20 is provided between the stationary platen 24 and the movable platen 28. The mold 20 includes a fixed mold 20a and a movable mold 20b. The fixed mold 20a is mounted on a surface of the stationary platen 24 that faces toward the movable platen 28. The movable mold 20b is mounted on a surface of the movable platen 28 that faces toward the stationary platen 24.

The toggle mechanism 29 is provided between the rear platen 26 and the movable platen 28. The toggle mechanism 29 is driven by the toggle drive mechanism 44, whereby the toggle mechanism moves the movable platen 28 toward and away from the stationary platen 24, and opens and closes the mold 20 in the direction A (i.e., in the opening/closing direction). The toggle mechanism 29 amplifies a driving force transmitted from the toggle drive mechanism 44 to a crosshead 40 described later and transmits the amplified driving force to the movable platen 28.

The toggle mechanism 29 includes toggle links 30, cross links 38, and a crosshead 40. The two toggle links 30 and the two cross links 38 are provided on each of the upper side and the lower side, i. e., the four toggle links and the four cross links are provided in total. In the drawing, one upper toggle link, one lower toggle link, one upper cross link, and one lower cross link on the front side are shown, and the two other toggle links and the two other cross links on the back side are hidden behind them. Each of the toggle links 30 contains a first link rod 30a, a second link rod 30b, a first toggle pin 30c, a second toggle pin 30d, and a third toggle pin 30e.

One end of the first link rod 30a is pivotably connected to the movable platen 28 through the first toggle pin 30c. One end of the second link rod 30b is pivotably connected to the rear platen 26 through the second toggle pin 30d. The other end of the first link rod 30a and the other end of the second link rod. 30b are pivotably connected to each other through the third toggle pin 30e.

The second link rod 30b is connected to the crosshead 40 through the cross link 38. The crosshead 40 includes arms 42 (an upper arm 42a and a lower arm 42b) extending upward and downward respectively. The cross link 38 is connected to a distal end portion of the arm 42. The crosshead 40 can move forward and backward in the direction A by being guided by two guide rods (not shown) that are provided in the rear platen 26 so as to extend in the direction A.

The toggle drive mechanism 44 drives the toggle mechanism 29 to open and close the mold 20 in the direction A (opening/closing direction). The toggle drive mechanism 44 includes a mold opening/closing motor 44a (drive source), a drive pulley 44b, a belt 44c, a driven pulley 44d, a ball screw 44e, and a ball screw nut 44f. The ball screw 44e is provided along the direction A so as to be parallel to the tie bars 32.

The drive pulley 44b is provided so as to be rotatable integrally with the rotary shaft of the mold opening/closing motor 44a. The driven pulley 44d is provided to be rotatable integrally with the ball screw 44e. The belt 44c is wound around the drive pulley 44b and the driven pulley 44d, and transmits the rotational force of the drive pulley 44b to the driven pulley 44d. The ball screw nut 44f is fixed to the crosshead 40 and screw-engaged with the ball screw 44e. The ball screw nut 44f (crosshead 40) moves along the ball screw 44e as the ball screw 44e rotates. That is, the drive pulley 44b, the belt 44c, the driven pulley 44d, the ball screw 44e, and the ball screw nut 44f constitute a conversion mechanism 44g that converts a rotational motion (rotational force) of the mold opening/closing motor 44a into a linear motion (stress) of the crosshead 40 in the direction A. In addition, the conversion mechanism 44g and the toggle mechanism 29 function as a mold clamping mechanism that generates a mold clamping force F between the fixed mold 20a and the movable mold 20b.

The rotational force (rotational motion) of the mold opening/closing motor 44a is converted into stress (linear motion) in the direction A by the conversion mechanism 44g. As a result, the crosshead 40 of the toggle mechanism 29 pushes the movable platen 28 in the direction A via the toggle mechanism 29, and the movable platen 28 moves along the direction A.

When the mold opening/closing motor 44a is rotated forward, the movable platen 28 moves toward the stationary platen 24, and the movable mold 20b comes into contact with the fixed mold 20a (which will be referred to as "a mold touching state", and at this time, the movable platen 28 is at a mold touching position). When the mold opening/closing motor 44a is further rotated forward in the mold touching state, stress (mold clamping force F) acts between the movable mold 20b and the fixed mold 20a. At this time, the tie bars 32 are elongated between the stationary platen 24 and the rear platen 26 by the mold clamping force F. That is, the elongation value L of the tie bars 32 corresponds to the amount of movement of the movable platen 28 relative to the stationary platen 24 after the mold touching state is established. When the movable mold 20b reaches the limit of movement by the toggle mechanism 29, the mold clamping device 22 is placed into a lock-up state. At this time, the elongation value L of the tie bars 32 and hence the mold clamping force F are sufficiently large.

In the lock-up state, a liquid resin material is injected into the mold 20 and solidified. Thereafter, by reversely rotating the mold opening/closing motor 44a, the movable platen 28 is moved toward the rear platen 26, the movable mold 20b is separated from the fixed mold 20a, and the mold 20 is opened.

The mold clamping device 22 has an ejector mechanism (not shown) for ejecting (taking out) a molded product from the movable mold 20b. The ejector mechanism is provided on the rear platen 26 side of the movable platen 28, and pushes the molded product out from the movable mold 20b by moving an ejector pin extending in the direction A toward the movable platen 28 in a state where the mold 20 is opened.

Figure 2:
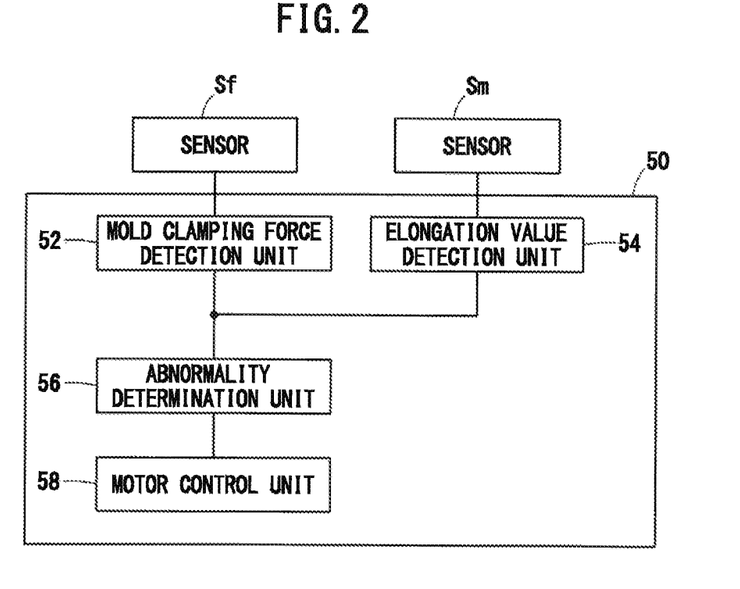
FIG. 2 is a functional block diagram of a control device for controlling the injection molding machine main body.

FIG. 2 is a functional block diagram of a control device 50 that controls the injection molding machine main body 12. The control device 50 opens and closes the mold 20, controls the injection molding machine main body 12 to generate the mold clamping force F, and detects an abnormality of the injection molding machine main body 12. The injection molding machine 10 is composed of the injection molding machine main body 12 and the control device 50. The control device 50 includes a mold clamping force detection unit 52, an elongation value detection unit 54, an abnormality determination unit 56, and a motor control unit 58. Detection signals from the sensors Sf, Sm are input to the control device 50.

The sensors Sf, Sm are installed in the injection molding machine main body 12, and detect a state of the injection molding machine main body 12. The sensor Sf detects a quantity (for example, stress, pressure, or strain) relating to the mold clamping force F. The sensor Sm detects a quantity relating to the elongation value L of the tie bar 32 (for example, elongation, strain, position of the rear platen 26).

The mold clamping force detection unit 52, the elongation value detection unit 54, the abnormality determination unit 56, and the motor control unit 58 can be configured by a processor (for example, a CPU: Central Processing Unit) and a program.

The mold clamping force detection unit 52 detects the mold clamping force F applied to the mold 20, based on the signal from the sensor Sf. This detection can be carried out directly or indirectly.

As the sensor Sf, for example, a mold clamping force sensor can be used to directly detect the mold clamping force F. As the mold clamping force sensor, a stress sensor (for example, a pressure sensor Sf1) installed in the mold 20 or the tie bars 32 can be used. For example, the stress sensor Sf1 is provided on at least one of the four tie bars 32 (FIG. 1 shows the pressure sensor Sf1 provided between one tie bar 32 and the stationary platen 24 as an example). As the sensor Sf, a strain sensor may be used to detect the mold clamping force F.

The elongation value detection unit 54 detects the elongation value L indicating an elongation amount of the tie bar 32 that is elongated as a result of application of the mold clamping force F, based on a signal from the sensor Sm. This detection can be carried out directly or indirectly.

For example, a strain sensor Sm1 can be used as the sensor Sm to directly detect the elongation value L of the tie bar 32. The strain sensor Sm1 can be installed on the tie bar 32 to directly detect the elongation value L of the tie bar 32. FIG. 1 shows, as an example, a strain sensor Sm1 provided on a side portion of the tie bar 32.

The elongation value L can be obtained based on the movement amount of the rear platen 26. That is, when the mold clamping force F is generated in the mold 20, the rear platen 26 is moved by the reaction force thereof. Therefore, the elongation value L of the tie bar 32 can be detected based on the movement amount of the rear platen 26. In this case, a position detector Sm2 (see FIG. 1) that detects the position of the rear platen 26 can be used as the sensor Sm. The elongation value detection unit 54 calculates, as the elongation value L, the amount of change in the position of the rear platen 26 after the fixed mold 20a and the movable mold 20b have come into contact with each other, based on a signal from the position detector Sm2.

The abnormality determination unit 56 determines there is an abnormality in the injection molding machine 10, based on a ratio R between the mold clamping force F and the elongation value L (for example, R=F/L), obtained after the mold touching. That is, when the ratio R of the change $\Delta F$ in the mold clamping force F to the change in the elongation value L is smaller than a threshold value Th0, it is determined to be abnormal. This determination is made during the mold clamping operation (in particular, between the mold touching position and the lock-up position).

Concerning this ratio R, on the basis of not only the elongation value L and the mold clamping force F (i.e., the ratio (R=F/L) between the mold clamping force F and the elongation value L) but also their differential values (infinitesimal change ΔL in the elongation value L, infinitesimal change ΔF in the mold clamping force F), the ratio (R=ΔF/ΔL) may be calculated, and the ratio (R=ΔF/ΔL) may be compared with the threshold value Th0.

When it is determined to be abnormal, there is a possibility that a crack, a break, or a chip has occurred in the tie bar 32. In addition, there is a possibility that a crack, a break, or a chip has occurred in a member other than the tie bars 32, for example, the ball screw 44e.

The motor control unit 58 controls the mold opening/closing motor 44a for the mold clamping operation and thereby moves the movable platen 28. When the abnormality determination unit 56 determines that there is an abnormality during the mold clamping operation, the motor control unit 58 controls the mold opening/closing motor 44a to stop the operation of the mold clamping device 22 (mold clamping mechanism) during or after the mold clamping operation. Failure of injection molding can be prevented by stopping the mold clamping operation. If the mold clamping operation and the subsequent injection molding are performed when it is determined to be abnormal, the mold clamping force F during the injection molding becomes insufficient, and there is a possibility that liquid resin material may leak from between the fixed mold 20a and the movable mold 20b.

Figure 3:
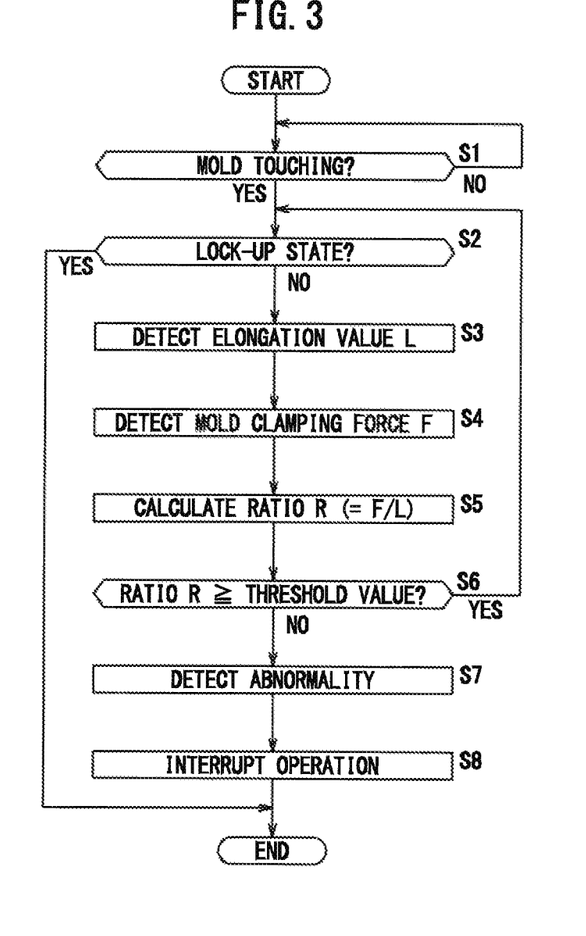
FIG. 3 is a flow chart showing a mold closing procedure of the injection molding machine.

FIG. 3 is a flow chart showing a mold closing procedure of the injection molding machine 10. The motor control unit 58 controls the mold opening/closing motor 44a to start the mold closing operation. That is, the motor control unit 58 forwardly rotates the mold opening/closing motor 44a to move the movable platen 28 toward the stationary platen 24. Accordingly, the movable mold 20b comes into contact with the fixed mold 20a (reaching the mold touching position, YES in step S1), and the mold clamping force F is generated in the mold 20. The mold touching can be detected based on, for example, the mold clamping force F calculated by the mold clamping force detection unit 52 (the mold clamping force F starts to change from substantially 0). The mold touching may be detected based on a change in power consumption (or drive current) in the mold opening/closing motor 44a (rapid increase in power consumption).

Thereafter, the motor control unit 58 continues the forward rotation of the mold opening/closing motor 44a until the lock-up state is reached (lock-up position, YES in step S2). During this time, the mold clamping force F increases. The lock-up can be detected based on, for example, a change in power consumption (or drive current) in the mold opening/closing motor 44a (the increase in power consumption stops). Further, the lock-up may be detected based on the position of the crosshead 40 or the like. In general, when the mold 20 is exchanged or the like, the die height adjustment is performed on the mold clamping device 22 such that a desired mold clamping force F can be obtained when the crosshead 40 is at a predetermined position (origin). After this adjustment, when the crosshead 40 reaches the origin, the lock-up can be regarded as being detected. The position of the crosshead 40 may be directly measured, or may be determined based on the elongation value L of the tie bar 32 or the like.

During a period from the mold touching state to the lock-up state, the elongation value detection unit 54 detects the elongation value L of the tie bars 32 (step S3), and the mold clamping force detection unit 52 detects the mold clamping force F applied to the mold 20 (step S4).

The abnormality determination unit 56 calculates a ratio R (=F/L) between the mold clamping force F and the elongation value L (step S5), and compares the ratio R with the threshold value (step S6). When the ratio R is equal to or greater than the threshold value (YES in step S6), it is determined that the injection molding machine 10 is normal, and the mold clamping operation is continued. When the ratio R is smaller than the threshold value (NO in step S6), the injection molding machine 10 is determined to be abnormal (step S7), and the mold clamping operation is interrupted by the motor control unit 58 (step S8).

Figure 4:
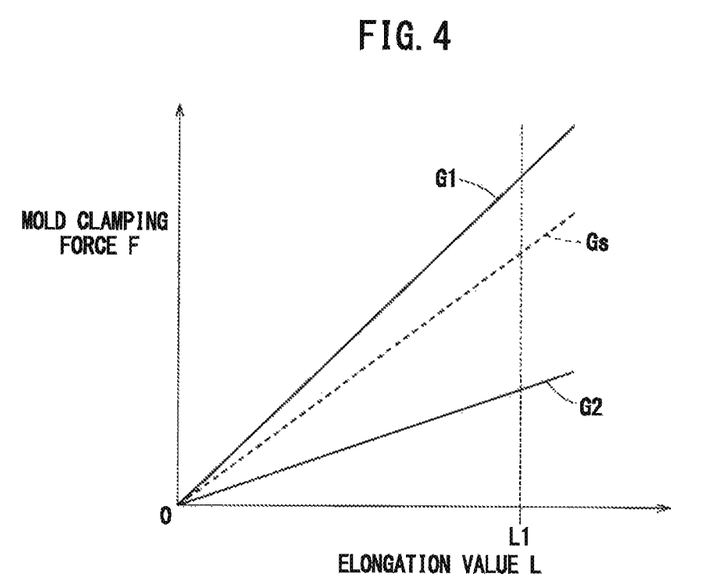
FIG. 4 is a graph showing an example of the relationship between the elongation value and the mold clamping force.

FIG. 4 is a graph showing an example of the relationship between the elongation value L and the mold clamping force F. The horizontal axis represents the elongation value L, and the vertical axis represents the mold clamping force F. The origin O of the elongation value L corresponds to the mold touching position, and the elongation value L1 corresponds to the lock-up position. As the elongation value L increases, the mold clamping force F also increases.

FIG. 4 shows graphs Gs, G1 and G2. The graph Gs is a reference graph in which the ratio of the mold clamping force F to the elongation value L has a reference value Rs (threshold value). The graph G1 is a graph in which the ratio of the mold clamping force F to the elongation value L is equal to or greater than the reference value Rs (threshold value), and in this case, the mold clamping operation is completed. On the other hand, the graph G2 is a graph in which the ratio of the mold clamping force F to the elongation value L is smaller than the reference value Rs (threshold value), and in this case, the mold clamping operation is interrupted in the middle.

[Modifications]

Hereinafter, modifications will be described, Here, the mold clamping force detection unit 52 calculates the mold clamping force F based on the torque (rotational force) P of the mold opening/closing motor 44a and the amplification factor $\beta_p$ of the force of the toggle mechanism 29. In addition, the elongation value detection unit 54 calculates an elongation amount of the tie bars 32 as an elongation value L, based on a rotation amount of the mold opening/closing motor 44a (motor) after the fixed mold 20a and the movable mold 20b has come into contact with each other and the amplification factor of the toggle mechanism 29.

The relationship between the rotation amount M of the mold opening/closing motor 44a (motor) and the elongation value L of the tie bars 32 (movement amount of the movable platen 28) is expressed by Equation (1). Further, the torque P of the mold opening/closing motor 44a (motor) and the mold clamping force have a relationship as shown in Equation (2).

$$L = \alpha m * \beta m(M) * M = Am(M) * M \quad (1)$$

$$F = \alpha p * \beta p(M) * P = Ap(M) * P \quad (2)$$

where $Am(M)=\alpha m*\beta m(M)$, and $Ap(M)=\alpha p*\beta p(M)$.

The rotation amount M is an amount of rotation (number of rotations) of the shaft of the mold opening/closing motor 44a, and can be detected by using a rotation detector Sm3 or the like installed in the mold opening/closing motor 44a (see FIG. 1). That is, the sensor Sm can be the rotation detector Sm3. The torque P is the rotational force of the shaft of the mold opening/closing motor 44a, and can be obtained on the basis of the power consumption or the drive current of the mold opening/closing motor 44*a*. That is, the sensor Sf can be a drive current sensor.

The amplification factors αm and αp are the amplification factor of the motion amount and the amplification factor of the stress in the conversion mechanism 44*g*, respectively. That is, the amplification factor αm is a ratio of an output-side motion amount of the conversion mechanism 44*g* (a movement amount of the crosshead 40) to an input-side motion amount of the conversion mechanism 44*g* (a rotation amount M in the mold opening/closing motor 44*a*). The amplification factor αp is a ratio of the stress output from the conversion mechanism 44*g* (stress applied to the crosshead 40) to the stress input to the conversion mechanism 44*g* (torque P in the mold opening/closing motor 44*a*). The amplification factors αm and αp in the conversion mechanism 44*g* are both constant (not depending on the rotation amount M), but generally have different values.

The amplification factors βm(M) and βp(M) are the amplification factor of the motion amount and the amplification factor of the stress in the toggle mechanism 29, respectively. That is, the amplification factor βm(M) is a ratio of an output-side motion amount of the toggle mechanism 29 (the movement amount of the movable platen 28) to an input-side motion amount of the toggle mechanism 29 (the movement amount of the crosshead 40). The amplification factor βp (M) is a ratio of the stress (force) output from the toggle mechanism 29 (i.e., applied from the first link rod 30*a* to the movable platen 28) to the stress (force) input to the toggle mechanism 29 (i.e., applied from the toggle drive mechanism 44 to the crosshead 40).

In general, the amplification factors βm(M) and βp(M) (as well as the amplification factors Am(M) and Ap(M)) vary in accordance with the angle θ formed by the toggle link 30 and the second link rod 30*b* (the position of the crosshead 40, that is, the rotation amount M). For example, the amplification factor βm(M) is relatively large at the mold touching position and relatively small at the lock-up position. The amplification factor βp(M) is relatively small at the mold touching position and relatively large at the lock-up position. As described above, the amplification factors βm(M) and βp(M) (also the amplification factors Am(M) and Ap(M)) depend on the rotation amount M, but the relationship with the rotation amount M (or the position of the crosshead 40) after the mold touching has occurred can be obtained in advance by using an analytical or experimental method. If the relationship between the rotation amount M and the amplification factors βm, βp obtained in advance as described above is stored as a table in a memory or the like, the elongation value L and the mold clamping force F can be calculated using the table.

Note that in the above equations (1) and (2), the elongation value L and the mold clamping force F are calculated using the amplification factors αm and αp in the conversion mechanism 44*g*, but the amplification factors αm and αp do not necessarily have to be used. That is, since the amplification factors αm and αp are constant values, values L' and F' corresponding respectively to the elongation value L and the torque P may be calculated on the basis of the following equations (3) and (4).

$$L'=\beta m(M)*M \quad (3)$$

$$F'=\beta p(M)*P \quad (4)$$

Even in this case, the abnormality determination unit 56 can determine whether there is an abnormality, by obtaining the ratio R (=F'/L') of the value F' to the value L' and comparing the ratio R with a threshold value. The threshold value in this case is determined in consideration of the amplification factors αm and αp. For example, the threshold Th in this case is determined to be "Th0*(αp/αm)".

In the above-described method, both the elongation value L and the mold clamping force F are calculated, but this method may be used for calculating only one of the elongation value L and the mold clamping force F, and the other may be obtained by the method described in the embodiment.

In other respects, the modification is not substantially different from the embodiment, and detailed description thereof will be omitted.

Invention Obtained from the Embodiment

Inventions that can be grasped from the above-described embodiment and the modifications thereof will be described below.

[1] The injection molding machine 10 includes: the stationary platen 24 configured to hold the fixed mold 20*a*; the rear platen 26; the tie bar 32 configured to connect the stationary platen 24 and the rear platen 26 to each other; the movable platen 28 that is disposed between the stationary platen and the rear platen and is configured to hold the movable mold 20*b* such that the movable mold faces the fixed mold and further configured to be movable along the tie bar; the mold clamping mechanism (conversion mechanism 44*g* and toggle mechanism 29) configured to generate the mold clamping force F between the fixed mold and the movable mold by moving the movable platen toward the stationary platen and bringing the fixed mold and the movable mold into contact with each other; the drive source (mold opening/closing motor 44*a*) configured to drive the mold clamping mechanism; the mold clamping force detection unit 52 configured to detect the mold clamping force; the elongation value detection unit 54 configured to detect the elongation value L indicating the elongation amount of the tie bar that is elongated as a result of generation of the mold clamping force; and the abnormality determination unit 56 configured to determine whether there is an abnormality in the injection molding machine based on a ratio R between the mold clamping force and the elongation value. With this configuration, the abnormality of the mechanical unit of the injection molding machine can be relatively easily detected based on the ratio between the mold clamping force and the elongation value.

[2] The abnormality determination unit determines that there is an abnormality if a ratio of a change in the mold clamping force to a change in the elongation value is smaller than a threshold value Th0. By comparing the ratio with the threshold value, it is possible to detect an abnormality in the mechanical unit of the injection molding machine.

[3] The mold clamping mechanism is a toggle-type mold clamping mechanism (conversion mechanism 44*g* and toggle mechanism 29), the drive source is a motor (mold opening/closing motor 44*a*), and the mold clamping force detection unit calculates the mold clamping force based on a torque of the motor after the fixed mold and the movable mold have come into contact with each other and an amplification factor of the mold clamping mechanism. With this configuration, the abnormality of the mechanical unit of the injection molding machine can be detected without using a mold clamping force sensor.

[4] The mold clamping force detection unit calculates the mold clamping force based on a signal from the mold clamping force sensor (Sf, Sf1). With this configuration, it is possible to detect an abnormality in the mechanical unit of the injection molding machine using the mold clamping force sensor.

[5] The mold clamping mechanism is a toggle-type mold clamping mechanism (conversion mechanism 44 and toggle mechanism 29), the drive source is a motor (mold opening/closing motor 44*a*), and the elongation value detection unit calculates the elongation amount of the tie bar 32 as the elongation value, based on at least a rotation amount of the motor after the fixed mold and the movable mold have come into contact with each other and an amplification factor of the mold clamping mechanism. With this configuration, the abnormality of the mechanical unit of the injection molding machine can be detected without using a position detector or a strain sensor.

[6] The elongation value detection unit calculates, as the elongation value, an amount of change in a position of the rear platen after the fixed mold and the movable mold have come into contact with each other, based on a signal from a position detector Sm2 configured to detect the position of the rear platen. With this configuration, it is possible to easily detect an abnormality in the mechanical unit of the injection molding machine using the position detector.

[7] The elongation value detection unit calculates the elongation amount of the tie bar based on a signal from a strain sensor Sm1. With this configuration, it is possible to easily detect an abnormality of the mechanical unit of the injection molding machine by using the strain sensor.

[8] The injection molding machine further includes a stop control unit (motor control unit 58) configured to control the drive source to stop operation of the mold clamping mechanism if the abnormality determination unit determines that there is an abnormality. With this configuration, the operation of the mold clamping mechanism can be stopped to prevent injection molding from failing.

The invention claimed is:

1. An injection molding machine comprising:
a stationary platen configured to hold a fixed mold;
a rear platen;
a tie bar configured to connect the stationary platen and the rear platen to each other;
a movable platen that is disposed between the stationary platen and the rear platen and is configured to hold a movable mold in a manner that the movable mold faces the fixed mold and further configured to be movable along the tie bar;
a mold clamping mechanism configured to generate a mold clamping force between the fixed mold and the movable mold by moving the movable platen toward the stationary platen and bringing the fixed mold and the movable mold into contact with each other;
a drive source configured to drive the mold clamping mechanism;
a mold clamping force detection unit configured to detect the mold clamping force;
an elongation value detection unit configured to detect an elongation value indicating an elongation amount of the tie bar that is elongated as a result of generation of the mold clamping force; and
an abnormality determination unit configured to determine whether there is an abnormality in the injection molding machine, based on a ratio between the mold clamping force detected by the mold clamping force detection unit and the elongation value detected by the elongation value detection unit after the fixed mold and the movable mold are brought into contact with each other.

2. The injection molding machine according to claim 1, wherein
the abnormality determination unit determines that there is an abnormality when a ratio of a change in the mold clamping force to a change in the elongation value is smaller than a threshold value.

3. The injection molding machine according to claim 1, wherein
the mold clamping mechanism is a toggle-type mold clamping mechanism,
the drive source is a motor, and
the mold clamping force detection unit calculates the mold clamping force based on a torque of the motor after the fixed mold and the movable mold have come into contact with each other and an amplification factor of the mold clamping mechanism.

4. The injection molding machine according to claim 1, wherein
the mold clamping force detection unit calculates the mold clamping force based on a signal from a mold clamping force sensor.

5. The injection molding machine according to claim 1, wherein
the mold clamping mechanism is a toggle-type mold clamping mechanism,
the drive source is a motor, and
the elongation value detection unit calculates the elongation amount of the tie bar as the elongation value, based on at least a rotation amount of the motor after the fixed mold and the movable mold have come into contact with each other and an amplification factor of the mold clamping mechanism.

6. The injection molding machine according to claim 1, wherein
the elongation value detection unit calculates, as the elongation value, an amount of change in a position of the rear platen after the fixed mold and the movable mold have come into contact with each other, based on a signal from a position detector configured to detect the position of the rear platen.

7. The injection molding machine according to claim 1, wherein
the elongation value detection unit calculates the elongation amount of the tie bar based on a signal from a strain sensor.

8. The injection molding machine according to claim 1, further comprising
a stop control unit configured to control the drive source to stop operation of the mold clamping mechanism if the abnormality determination unit determines that there is an abnormality.

9. The injection molding machine according to claim 1, wherein the mold clamping force detection unit, the elongation value detection unit, and the abnormality determination unit are configured by a processor executing program instructions stored in a memory, and
wherein the abnormality determination unit is configured to determine whether there is an abnormality in the injection molding machine, based on a ratio between a change in the mold clamping force and a change in the elongation value.

10. A computer readable medium storing instructions for the mold clamping force detection unit, the elongation value detection unit, and the abnormality determination unit in the injection molding machine according to claim 1.

11. An injection molding machine comprising:
a tie bar configured to connect a stationary platen configured to hold a fixed mold and a rear platen to each other;
a movable platen that is disposed between the stationary platen and the rear platen and is configured to hold a movable mold in a manner that the movable mold faces the fixed mold and further configured to be movable along the tie bar;
a mold clamping mechanism configured to generate a mold clamping force between a fixed mold and a movable mold by moving the movable platen toward the stationary platen and bringing the fixed mold and the movable mold into contact with each other;
a drive source configured to drive the mold clamping mechanism;
a mold clamping force detection unit configured to detect the mold clamping force;
an elongation value detection unit configured to detect an elongation value indicating an elongation amount of the tie bar that is elongated as a result of generation of the mold clamping force; and
an abnormality determination unit configured to determine whether there is an abnormality in the injection molding machine, based on a ratio between the mold clamping force detected by the mold clamping force detection unit and the elongation value detected by the elongation value detection unit after the fixed mold and the movable mold are brought into contact with each other.

12. The injection molding machine according to claim 11, wherein
the abnormality determination unit determines that there is an abnormality when a ratio of a change in the mold clamping force to a change in the elongation value is smaller than a threshold value.

13. The injection molding machine according to claim 11, wherein
the mold clamping mechanism is a toggle-type mold clamping mechanism,
the drive source is a motor, and
the mold clamping force detection unit calculates the mold clamping force based on a torque of the motor after the fixed mold and the movable mold have come into contact with each other and an amplification factor of the mold clamping mechanism.

14. The injection molding machine according to claim 11, wherein
the mold clamping force detection unit calculates the mold clamping force based on a signal from a mold clamping force sensor.

15. The injection molding machine according to claim 11, wherein
the mold clamping mechanism is a toggle-type mold clamping mechanism,
the drive source is a motor, and
the elongation value detection unit calculates the elongation amount of the tie bar as the elongation value, based on at least a rotation amount of the motor after the fixed mold and the movable mold have come into contact with each other and an amplification factor of the mold clamping mechanism.

16. The injection molding machine according to claim 11, wherein
the elongation value detection unit calculates, as the elongation value, an amount of change in a position of the rear platen after the fixed mold and the movable mold have come into contact with each other, based on a signal from a position detector configured to detect the position of the rear platen.

17. The injection molding machine according to claim 11, wherein
the elongation value detection unit calculates the elongation amount of the tie bar based on a signal from a strain sensor.

18. The injection molding machine according to claim 11, further comprising
a stop control unit configured to control the drive source to stop operation of the mold clamping mechanism if the abnormality determination unit determines that there is an abnormality.

19. A control device for an injection molding machine, the injection molding machine including a stationary platen configured to hold a fixed mold, a rear platen, a tie bar configured to connect the stationary platen and the rear platen to each other, a movable platen that is disposed between the stationary platen and the rear platen and is configured to hold a movable mold in a manner that the movable mold faces the fixed mold and further configured to be movable along the tie bar, a mold clamping mechanism configured to generate a mold clamping force between the fixed mold and the movable mold by moving the movable platen toward the stationary platen and bringing the fixed mold and the movable mold into contact with each other, a drive source configured to drive the mold clamping mechanism, the control device comprising:
a memory storing computer instructions;
a processor executing the computer instructions and configured to:
detect the mold clamping force;
detect an elongation value indicating an elongation amount of a tie bar that is elongated as a result of generation of the mold clamping force; and
determine whether there is an abnormality in the injection molding machine, based on a ratio between the mold clamping force that is detected and the elongation value that is detected after the fixed mold and the movable mold are brought into contact with each other.

20. The control device of the injection molding machine according to claim 19, wherein the processor is further configured to determine that there is an abnormality when the ratio of the mold clamping force to the elongation value is less than a threshold value, and
wherein the mold clamping force based on a torque of the motor after the fixed mold and the movable mold have come into contact with each other and an amplification factor of the mold clamping mechanism.

* * * * *